(12) United States Patent
Thiagarajan et al.

(10) Patent No.: US 10,979,117 B2
(45) Date of Patent: Apr. 13, 2021

(54) METHOD, SYSTEM AND APPARATUS FOR BEAM FORMING IN A RADIO FREQUENCY TRANSCEIVER WITH REDUCED COMPLEXITY

(71) Applicant: MMRFIC Technology Pvt. Ltd., Bangalore (IN)

(72) Inventors: Ganesan Thiagarajan, Bengaluru (IN); Saravanakumar Ganeshan, Bengaluru (IN)

(*) Notice: Subject to any disclaimer, the term of this patent is extended or adjusted under 35 U.S.C. 154(b) by 0 days.

(21) Appl. No.: 16/540,416

(22) Filed: Aug. 14, 2019

(65) Prior Publication Data
US 2020/0195327 A1    Jun. 18, 2020

(30) Foreign Application Priority Data

Dec. 15, 2018    (IN) .......................... IN201841047549

(51) Int. Cl.
| | |
|---|---|
| *H04B 7/06* | (2006.01) |
| *H01Q 3/30* | (2006.01) |
| *H04B 7/08* | (2006.01) |
| *H04B 1/40* | (2015.01) |

(52) U.S. Cl.
CPC ............ *H04B 7/0617* (2013.01); *H01Q 3/30* (2013.01); *H04B 1/40* (2013.01); *H04B 7/08* (2013.01)

(58) Field of Classification Search
CPC ... H01Q 3/30; H04B 1/40; H04B 7/08; H04B 7/0617
See application file for complete search history.

(56) References Cited

U.S. PATENT DOCUMENTS

| | | | | | |
|---|---|---|---|---|---|
| 5,573,001 | A | * | 11/1996 | Petrofsky ............ | G01S 7/52026 600/447 |
| 8,690,782 | B2 | * | 4/2014 | Colby ................. | G01S 7/52023 600/447 |
| 2014/0357319 | A1 | * | 12/2014 | Maltsev .................... | G01S 3/38 455/562.1 |
| 2016/0269093 | A1 | * | 9/2016 | Seol ..................... | H04B 7/0695 |
| 2017/0111149 | A1 | * | 4/2017 | Kim ..................... | H04B 7/0617 |
| 2018/0006696 | A1 | * | 1/2018 | Yue ...................... | H04B 7/0486 |
| 2018/0109305 | A1 | * | 4/2018 | Obara .................. | H04B 7/0617 |
| 2019/0081693 | A1 | * | 3/2019 | Eitan ........................ | H01Q 3/36 |
| 2020/0007222 | A1 | * | 1/2020 | Ruder ................. | H04L 25/0204 |
| 2020/0091608 | A1 | * | 3/2020 | Alpman ............... | H01Q 9/0414 |

* cited by examiner

*Primary Examiner* — Jaison Joseph (57) ABSTRACT

A radio frequency receiver comprises a plurality of receiving antennas providing a plurality of radio frequency (RF) signals, a first set of phase shifters providing a first set of analog beams from a first set of RF signals in the plurality of RF signals, a second set of phase shifters providing second set of analog beams from a second set of RF signals and a digital beamformer providing final set of beams employing the first set of analog beams and the second set of analog beams. Similarly a radio frequency transmitter comprises a digital beamformer providing a plurality of digital beams, a first set of splitter splitting a first set of digital beams in the plurality of digital beams into first set of analog beams, a second set splitter splitting a second set of digital beams in the plurality of digital beams into second set of analog beams, a first set of phase shifters providing a first set of analog beams, a second set of phase shifters providing second set of analog beams, a set of adder adding the first of analog beams and second set of analog beams to form the set of RF signals.

9 Claims, 7 Drawing Sheets

METHOD, SYSTEM AND APPARATUS FOR BEAM FORMING IN A RADIO FREQUENCY TRANSCEIVER WITH REDUCED COMPLEXITY

CROSS REFERENCES TO RELATED APPLICATIONS

This application claims priority from Indian patent application No. 201841047549 filed on Dec. 15, 2018 which is incorporated herein in its entirety by reference.

BACKGROUND

Field of Invention

Embodiments of the present disclosure relate to wireless transceivers and more particularly relate to method, system and apparatus for beam forming in a radio frequency transceiver with reduced complexity.

Related Art

Wireless transceivers often employ RF antennas for radiating and collecting the RF signal (electromagnetic waves) for transmitting and receiving wireless signals. For example, wireless communication system such as 3G/4G/5G systems, RADAR systems and object detection systems employ RF antennas to transmit and receive RF signals. The antenna radiates the RF signal energy in all directions. Thus, the energy transmitted in any desired direction is lesser than the total energy/strength radiated by the antenna. In order to enhance the transmitted RF signal strength (gain) in a particular direction, beam forming techniques are employed. In the beam forming technique multiple phase shifted version of the RF signal are transmitted or received on a plurality of antennas (antenna array) as is well known in the art. The conventional beam forming technique is further described in the literature titled Multibeam Antenna Technologies for 5G Wireless Communications by Wei Hong, et al, published in IEEE transactions on antennas and propagation, vol. 65, no. 12, December 2017, which is incorporated herein by reference. Briefly, beam forming (generating multiple phase shifted signals) is performed in analog mode, digital mode and hybrid mode.

Figure 1A:
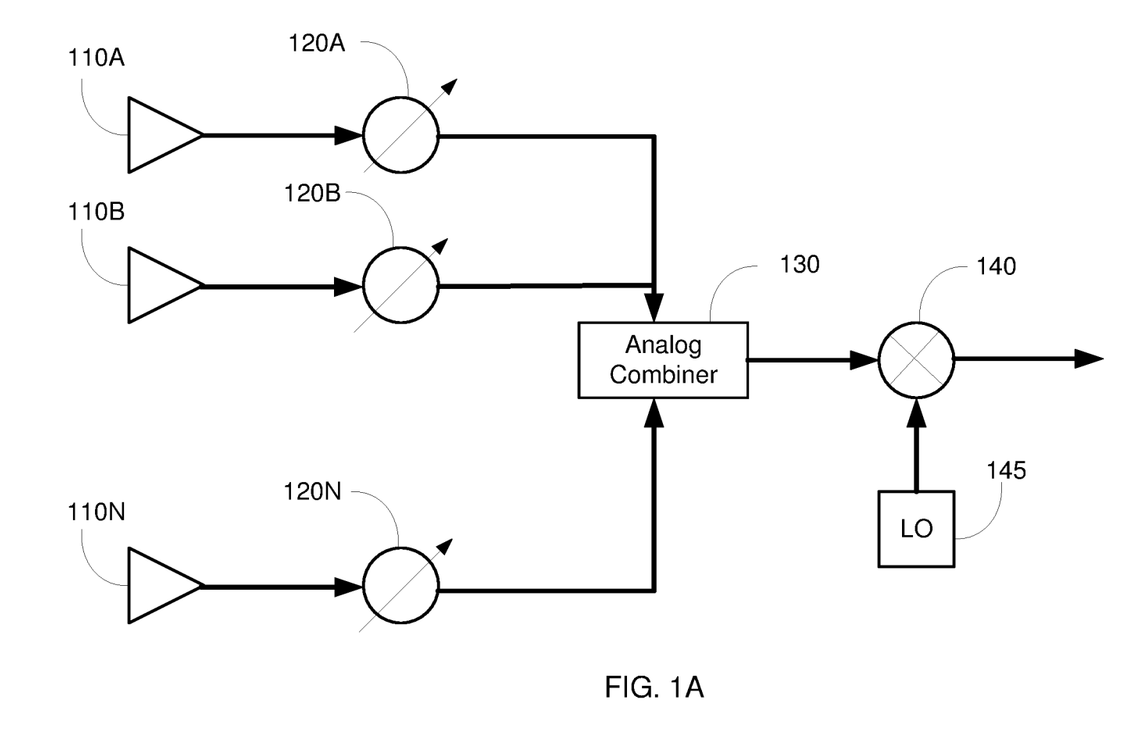
FIG. 1A illustrates an example conventional analog beam forming.

FIG. 1A illustrates an example conventional analog beamforming. As shown there, the antennas 110A-N receives the RF signals, the phase shifters 120A-N shift the phase of the corresponding received RF signals, the combiner 130 combines the phases sifted RF signals. The multiplier 140 and local oscillator (LO) 145, converts the RF signal received from the combiner to base band signal for further processing. The combined RF signal provided by combiner 130 is represented by relation:

$$Y = \Sigma_{i=0}^{n} W_i X_i, \qquad (1)$$

In that, Xi represents signals received from antennas, $W_i$ represents the weights (phases shift and gain) provided to the corresponding ones of $X_i$ signals. Accordingly, as the number of antenna increases to reduces the beam width, the $W_i$ requires to be in smaller phase values (at least when beams are required to be steered in smaller angle or good angular resolution). The analog conventional beam forming places limitation (at least in terms of the analog hardware part) on the smaller phase values in $W_i$.

Figure 1B:
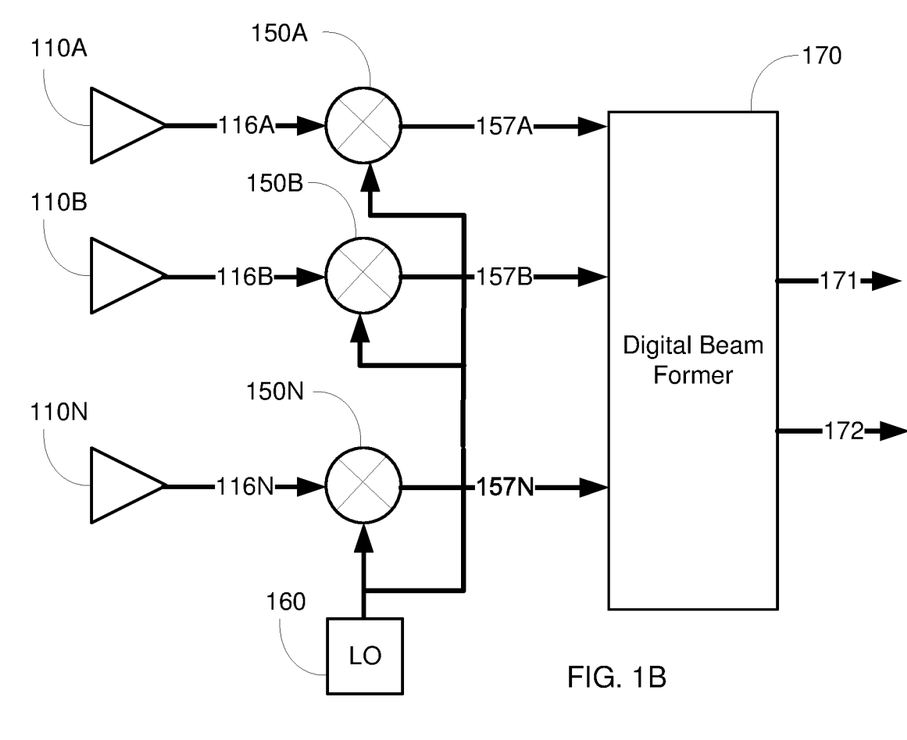
FIG. 1B illustrates an example conventional digital beam forming.

FIG. 1B illustrates an example conventional digital beam forming. As shown there, the antennas 110A-N receives the RF signals, the mixers 150A-N mixes the RF signals on corresponding channels 116A-N with a reference signal from LO 160 to convert each RF signal to respective baseband signals 157A-N. Digital Beam former 170 performs beam forming to provide baseband beams on paths 171 and 172. The beamformer output Y may be represented using relation:

$$Y = WX, \qquad (2)$$

in that, W represents a weight matrix and X represents the input baseband signal vector.

As is well known in the art, the conventional digital beam former 170 may perform digitization of the RF signal and may perform matrix multiplication with the weight matrix. Due to digital processing with large bit width multipliers, a smaller beam width (high resolution) may be obtained. In other words, a smaller phase shifts may be achieved in the digital processing, thereby accommodating any desired beam direction and resolution. However, the digital beam former increases the complexity of the hardware as the number of base band converter (base band processing channels) increase with increasing number of receiving/transmitting antennas.

Figure 1C:
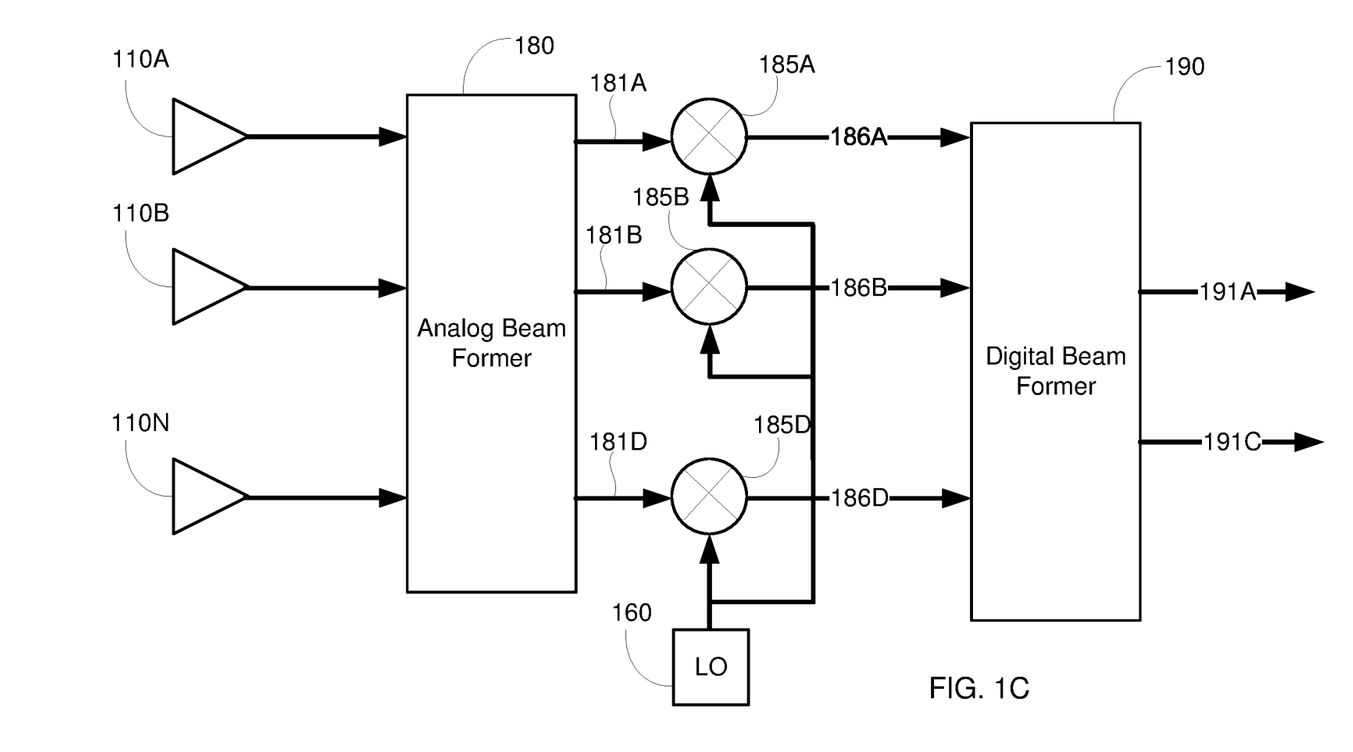
FIG. 1C illustrates an example conventional hybrid beam forming.

FIG. 1C illustrates an example conventional hybrid beam forming. As shown there, the antennas 110A-N receives the RF signals, the analog beam former 180 generates set of beams 181A-D, the Base band processing channel 185A-D converts the RF beam 181A-181D to corresponding baseband beam 186A-D, digital beam former 190 performs digital beam forming on the base band signals 186A-D to generate digitized beams 191 A-C.

As is well known in the art, the number of base band converting channels is reduced due to first level of analog beam forming (180) and the benefits of smaller phase angles (high resolution) are obtained by employing the digital beam former (190). The conventional hybrid beam former reduces the hardware complexity by reducing the number of baseband processing channels. However, such reduction in the hardware causes the reduced flexibility at the digital beam former.

SUMMARY

According to an aspect of present disclosure, a radio frequency receiver is provided for beamforming comprises a plurality of receiving antennas providing a plurality of radio frequency (RF) signals, a first set of phase shifters providing a first set of analog beams from a first set of RF signals in the plurality of RF signals, a second set of phase shifters providing second set of analog beams from a second set of RF signals and a digital beamformer providing final set of beams employing the first set of analog beams and the second set of analog beams. The receiver further comprises a set of splitters generating a copy of the first set of RF signals, wherein the second set of RF signals are the copy of the first set of RF signals. The receiver further comprises a first set of delay elements adding a first delay in time to each of the first set of analog beams and a second set of delay elements adding a second delay in time to each of the second set of analog beams before providing to the digital beamformer.

According to another aspect of the present disclosure, a radio frequency transmitter is provided for beamforming comprises a plurality of transmitting antennas transmitting a set of radio frequency (RF) signals, a digital beamformer providing a plurality of digital beams, a first set of splitter splitting a first set of digital beams in the plurality of digital beams into first set of analog beams, a second set splitter splitting a second set of digital beams in the plurality of digital beams into second set of analog beams, a first set of phase shifters providing a first set of analog beams, a second set of phase shifters providing second set of analog beams, a set of adder adding the first of analog beams and second set of analog beams to form the set of RF signals.

DETAILED DESCRIPTION OF THE PREFERRED EXAMPLES

Figure 2:
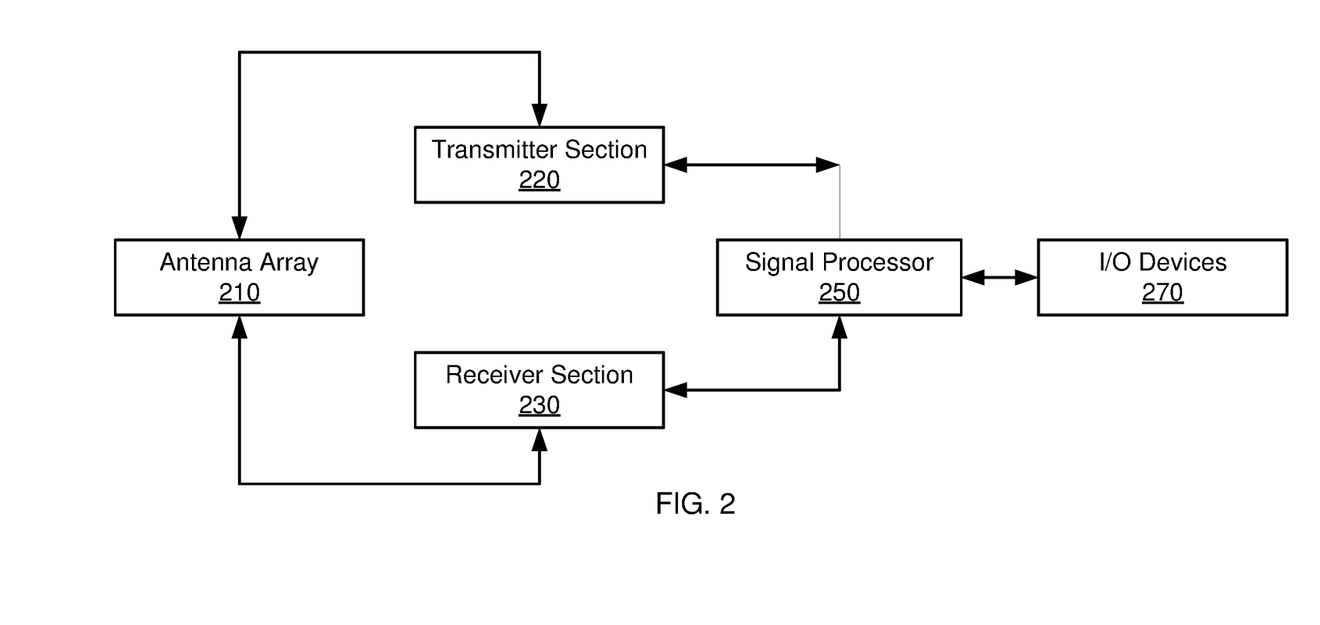
FIG. 2 is an example RF transceiver system in an embodiment.

FIG. 2 is an example RF transceiver system in an embodiment. The transceiver is shown comprising antenna array 210, transmitter section 220, receiver section 230, signal processor 250, and input/output (I/O) devices 270. Each block is further described below.

The antenna array 210 operates to transmit and receive RF signal over the free space 205. The antenna array 210 may be a one dimensional array or a two dimensional array. In that, elements may operate in a time divisional manner to transmit and/or receive. Alternatively, the dedicated antenna elements may be interspersed in the array pattern.

The transmitter section 220 provides a set of successively phase shifted version of a RF signal for transmission over the antenna array 210. The phase difference between the successively phase shifted signals of each RF signal causes an RF beam with a gain A and beam width B to be formed in the free space when transmitted over the antenna array 210. Similarly, the receiver section 230 receives a set of RF signals from the antenna array 210. The receiver 230 determines the beam from the set of received RF signal. The beam direction and other information are provided for further processing on the path 235.

The signal processor 250, provides a signal to the transmitter 220 for transmission and receives a signal from the receiver 230 for further processing. In one embodiment, the transmitter 220, receiver 230 and processor may be implemented as single system on chip (SOC) integrated circuit device. As a result, intercommunication and signal flow between the units may occur as per the architecture of the SOC.

The I/O devices 270 provide various interface to external world. For example, the I/O devices 270 may comprise, display device for controlling and viewing the operation/result. Similarly, the I/O device 270 may comprise input devices like keypads, etc., for receiving the signal and commands for processing. In one embodiment the RF transceiver 201 operate as 3G/4G/5G communication system. In an alternative embodiment, the RF transceiver may operate as RADAR system to determine the object.

In one embodiment, the transmitter 220 and receiver 230 perform beam forming to respectively transmit the RF signal in a desired direction and determine the direction of the received RF signal. The manner in which the beam forming is performed in the transmitter and receiver in an embodiment is further described below.

Figure 3:
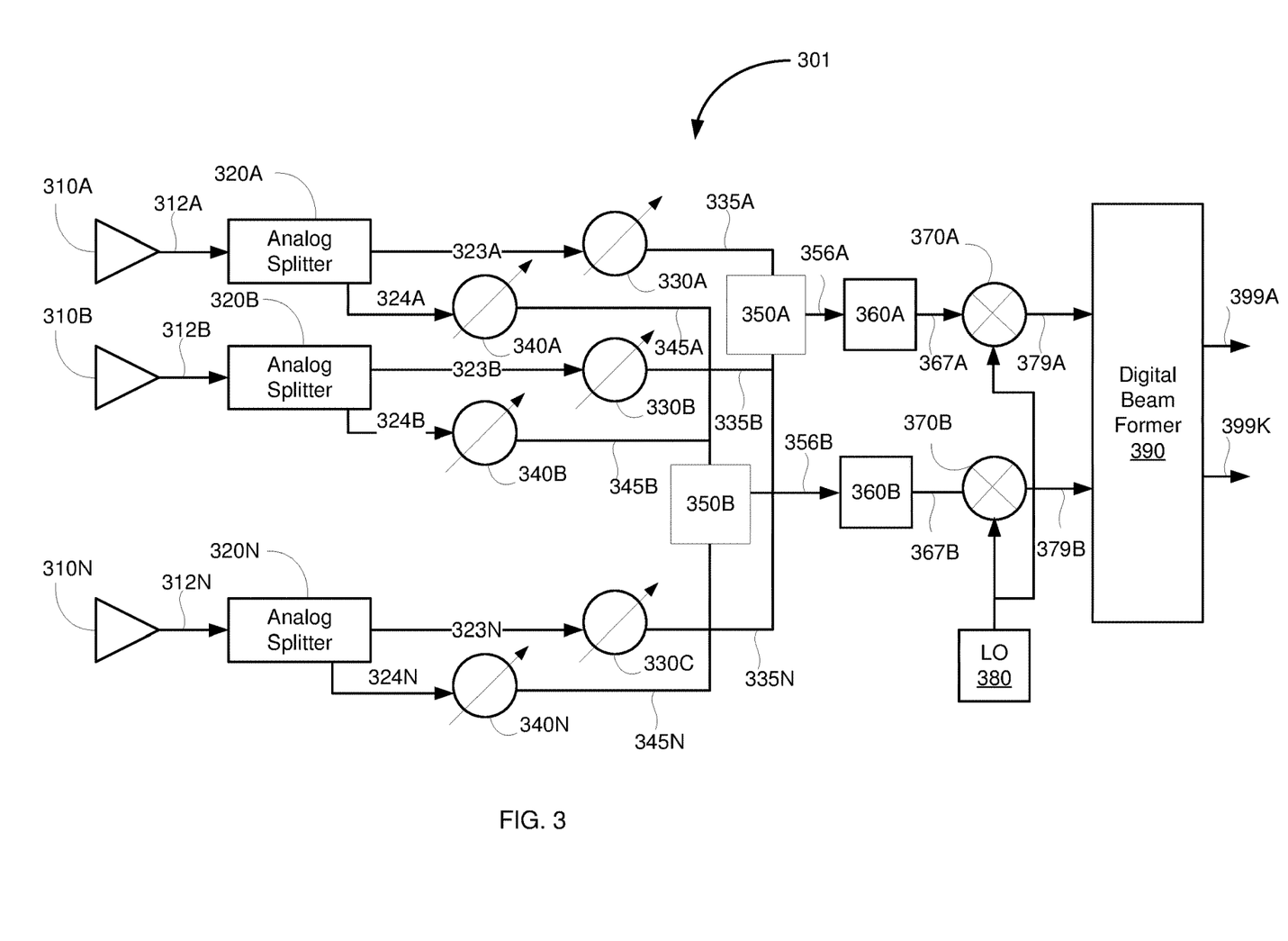
FIG. 3 is an example receiver section illustrating the beam forming in an embodiment.

FIG. 3 is an example receiver section illustrating the beam forming in an embodiment. The receiver section is shown comprising antenna array 310A-N, analog splitters 320A-320N, first set of phase shifters 330A-N, second set of phase shifters 340A-N, analog combiner 350A & B, delay elements 360A & B, mixer 370A-K, LO 380, and digital beam former 390. Each element is described in further detail below.

The antenna array 310A-N operate to receive RF signal over the free space. The antenna array 310 may be deployed and operative similar to antenna array 210. Each antenna 310A-N captures electromagnetic RF signal and provides the captured RF signal on the path 312A-N. The splitter 320A-N splits the RF signal on each path 312A-N to respective paths of 323A-N and 324A-N.

In an embodiment, the splitter may divert/copy/split the signal received from each antenna on to multiple paths. The splitter 320A-N is shown to copy the signal on to only two paths merely for illustration. The splitters 320A-N may be implemented by simply joining the conductor paths. Alternatively, splitter may be implemented as an electronic circuitry that provide signal with enhanced strength on the paths without loading the antenna.

The first set of phase shifters 330A-N shifts the phase of the signal received on the corresponding paths 323A-N by corresponding set of values such that they are mutually shifted in phase and amplitude. For example, the signal on path 323A may be shifted by a value $\Phi_1$ the signal on path 323B may be shifted by a value $\Phi_2$ and so on. The magnitude and phase changes provided by the phase shifters 330A-N (in case of a complex multipliers) to the signal on paths 323A-N may be respectively represented by weights $W_1$ through $W_N$. The signals weighted by the first set of phase shifters 330A-N is provided respectively on paths 335A-N.

The second set of phase shifters 340A-N shifts the phase of the signal received on the corresponding paths 324A-N by corresponding set of values. For example, the signal on path 324A may be shifted by a value $\psi_1$ the signal on path 324B may be shifted by a value $\psi_2$ and so on. The magnitude and phase changes provided by the phase shifters 340A-N to the signal on paths 324A-N may be respectively represented by weights $U_1$ through $U_N$. The signals weighted by the second set of phase shifters 340A-N is provided respectively on paths 345A-N.

The analog combiner 350A combines the signal on paths 335A-N and the analog combiner 350B combines the signal on paths 345A-N. The combiner 350A and 350B may perform signal summation operation in an embodiment. The analog combiner 350A and 350B respectively provides the combined signal on path 356A and 356B. The combined signal on path 356A and 356B represents the first level of beam forming as an analog beamforming.

The signal on path 356A and 356B (alternatively, one or more than one signals representing one or more than beams) may be represented respectively by relations $$y_1 = \Sigma_{i=0}^n W_i x_i, y_2 = \Sigma_{i=0}^n U_i x_i, \text{ so on.} \quad (3)$$

In that, the $x_i$ representing the RF signal from the i-th antenna 310A-N, the $W_i$ representing weights (phase angle and gain) provided by the first set of phase shifters 330A-N and the $U_i$ representing weights (phase angle and gain) provided by the second set of phase shifters 340A-N.

The delay elements 360A & 360B delays the signals on paths 356A and 356B. The delayed signals are provided on path 367A & B. The delay added to each path may be represented as $\Delta_1$ and $\Delta_2$. The signal on paths 367A and 367B may be represented by relation $y_1(t_1-\Delta_1)$, $y_2(t_2-\Delta_2)$ and so on. The local oscillators (LO) 380 provides a reference frequency signal to convert the combined RF signals 367A and 367B to base band signals.

The mixer 370A and 370B mixes the signal on path 367A and 367B with the reference signal from the LO 380 to convert the RF signal on paths 367A and 367B to base band signal. The base band signal is from the mixer 370A and 370B is provided on path 379A and 379B to the digital beam former 390.

The digital beam former 390 perform digital beam forming using the signal received on the paths 379A and 379B. The digital beam former 390 may comprise base band signal processing circuitry, analog to digital converters, etc., for each base band signal path 379A and 379B. In one embodiment, k number of beams (in the digital values) are formed and provided on paths 399A-K. The digital beams on the paths 399A-K may be represented as:

$$\begin{bmatrix} z_1 \\ z_2 \\ \cdot \\ z_L \end{bmatrix} = \underbrace{\begin{bmatrix} D_{11} & \cdots & D_{1k} \\ \vdots & \vdots & \vdots \\ D_{L1} & \cdots & D_{Lk} \end{bmatrix}}_{H} \begin{bmatrix} y_1(t_1-\Delta_1) \\ y_2(t_2-\Delta_2) \\ \vdots \\ y_k(t_k-\Delta_k) \end{bmatrix} \quad (4)$$

In that, the $z_1$ through $z_L$ representing digital beams on paths 399A-K, $D_{11}$ through $D_{Lk}$ digital weights of the digital beam former 390, in that, $D_{11}$ through $D_{kk}$ are arranged in a L×k matrix.

The example receiver section 301 is illustrated with the two combiners for illustration. The number of combiners may be desirably selected to perform analog beam forming on the RF signal with desired resolution.

The combiners and the set of antennas coupled to the combiners may be selected by choice to provide variable number of base band channels to the digital beam forming. Thus, it may be appreciated that, the receiver section 301 provides larger flexibility to select the number of base band channels to digital beam former 390 for digital beam forming. As may be further appreciated, the second set of phase shifters, delay elements may enhance the antenna aperture without increasing the number of antennas.

For example, the delay values may be selected corresponding to antenna array position and the phase values of $U_n$ may be set equal to $W_n$ for increased antenna aperture. Alternatively, the delay element value may be set to zero and the $U_n$ may be selected different from $W_n$ to increase the number of beams provided to the digital beam former.

Thus, the analog splitters 320A-320N, and values of first set of phase shifters 330A-N, second set of phase shifters 340A-N, analog combiner 350A&B and the delay elements 360 A and B may be selectively adjusted to either provide more number of RF beams to the digital beam former and/or may be adjusted to provide increased antenna aperture by concatenating time delayed version of the RF beamformer output.

The receiver section 301 may be further represented by a relation:

$$\begin{bmatrix} z_1 \\ z_2 \\ \cdot \\ z_L \end{bmatrix} = \begin{bmatrix} y_1(t_1-\Delta_1) \\ y_2(t_2-\Delta_2) \\ \cdot \\ y_k(t_k-\Delta_k) \end{bmatrix} = \underbrace{\begin{bmatrix} A_{11} & \cdots & A_{1n} \\ \vdots & \vdots & \vdots \\ A_{L1} & \cdots & A_{Ln} \end{bmatrix}}_{H} \begin{bmatrix} x_1 \\ x_2 \\ \cdot \\ x_n \end{bmatrix} \quad (5)$$

in that, matrix H representing an equivalent weight matrix from both analog part of the beam forming (phase shifters 330A-N, second set of phase shifters 340A-N and analog combiner 350A&B) and digital part of beam forming (mixer 360A-K, LOs 370A-K, and digital beam former 370).

As may be appreciated, the weights $A_{11}$ through $A_{Ln}$ represents the combined effective weights (with or without the delays Delta_i in each of the paths). The delays can be incorporated by multiplying by suitable complex phase in the case of narrow band signals. For wide band signals, delays are incorporated separately, and they are not part of H matrix obtained from both analog part and digital part of the beamformer.

The values $A_{11}$ through $A_{Ln}$ in the matrix H determines the resolution, direction, strength of the beam formed by the system 301. Alternatively, the matrix H represents the beam former transfer function of 301. Accordingly, the suitable values for weights $A_{11}$ through $A_{Ln}$ may be set to obtain the desired beam performance.

Once the values of $A_{11}$ through $A_{Ln}$ are determined for desired performance, the same may be decomposed into analog and digital weights w, U, and D in a suitable manner. For example, more precession sensitive weights may be moved to digital beam former and lesser precession weights may be incorporated in the analog part. The manner in which the matrix H may be decomposed in to analog and digital weights is further discussed below.

In one embodiment the matrix H may be decomposed in to analog and the digital weights by the singular value decomposition operation and may be represented by relation:

$$\begin{bmatrix} y_1(t_1-\Delta_1) \\ y_2(t_2-\Delta_2) \\ \cdot \\ y_k(t_k-\Delta_k) \end{bmatrix} = \underbrace{[U\sum][V^H]}_{SVD\ of\ H} \begin{bmatrix} x_1 \\ x_2 \\ \cdot \\ x_n \end{bmatrix} \quad (6)$$

In that, the $U\Sigma$ representing digital weights and is a matrix and $V^H$ analog weights and is also a unitary matrix as precision requirements are less for unitary matrices. Further, it may be decided as to which beam should be given more importance (or higher precision) based on the singular value matrix $\Sigma$. In accordance with the decomposition, the summation operation (combiner operation) may be performed within the digital beam former 390 itself. The digital beamformer operation may be viewed as product of the weight matrix and the data vector coming from the analog beamformer (after down conversion and ADC). This is automatically done here by the matrix multiplication of $V^H$.

In an yet another alternative embodiment, the weights of H may be decomposed as:

$$\begin{bmatrix} y_1(t_1 - \Delta_1) \\ y_2(t_2 - \Delta_2) \\ . \\ y_k(t_k - \Delta_k) \end{bmatrix} = \underbrace{[U][\sum V^H]}_{SVD\ of\ H} \begin{bmatrix} x_1 \\ x_2 \\ . \\ x_n \end{bmatrix} \quad (7)$$

In that, the U representing digital weights and is a unitary matrix and $\Sigma V^H$ analog weights and is scaled unitary matrix with a smaller dimension and less weights.

In yet another alternative embodiment, the weights of H may be decomposed using Q and R decomposition (also referred to as QR factorization). In that, the matrix H is decomposed into a product H=QR of an orthogonal matrix Q and an upper triangular matrix R. Accordingly the relation may be represented as:

$$\begin{bmatrix} y_1(t_1 - \Delta_1) \\ y_2(t_2 - \Delta_2) \\ . \\ y_k(t_k - \Delta_k) \end{bmatrix} = \underbrace{[Q][R]}_{H} \begin{bmatrix} x_1 \\ x_2 \\ . \\ x_n \end{bmatrix} \quad (8)$$

In that, the Q representing digital weights matrix and is a unitary matrix and R representing the analog weights and is an upper triangular matrix with a reduced number of weights.

In a similar manner, in one embodiment, the weights of H may be decomposed using S and P decomposition (also referred to as Polar decomposition). In that, the matrix H is decomposed into a product H=S·P, in that S is an orthonormal columns and P is positive semi-definite as is known in the literature. Accordingly, the relation may be represented as:

$$\begin{bmatrix} y_1(t_1 - \Delta_1) \\ y_2(t_2 - \Delta_2) \\ . \\ y_k(t_k - \Delta_k) \end{bmatrix} = \underbrace{[S][P]}_{H} \begin{bmatrix} x_1 \\ x_2 \\ . \\ x_n \end{bmatrix} \quad (9)$$

Figure 4:
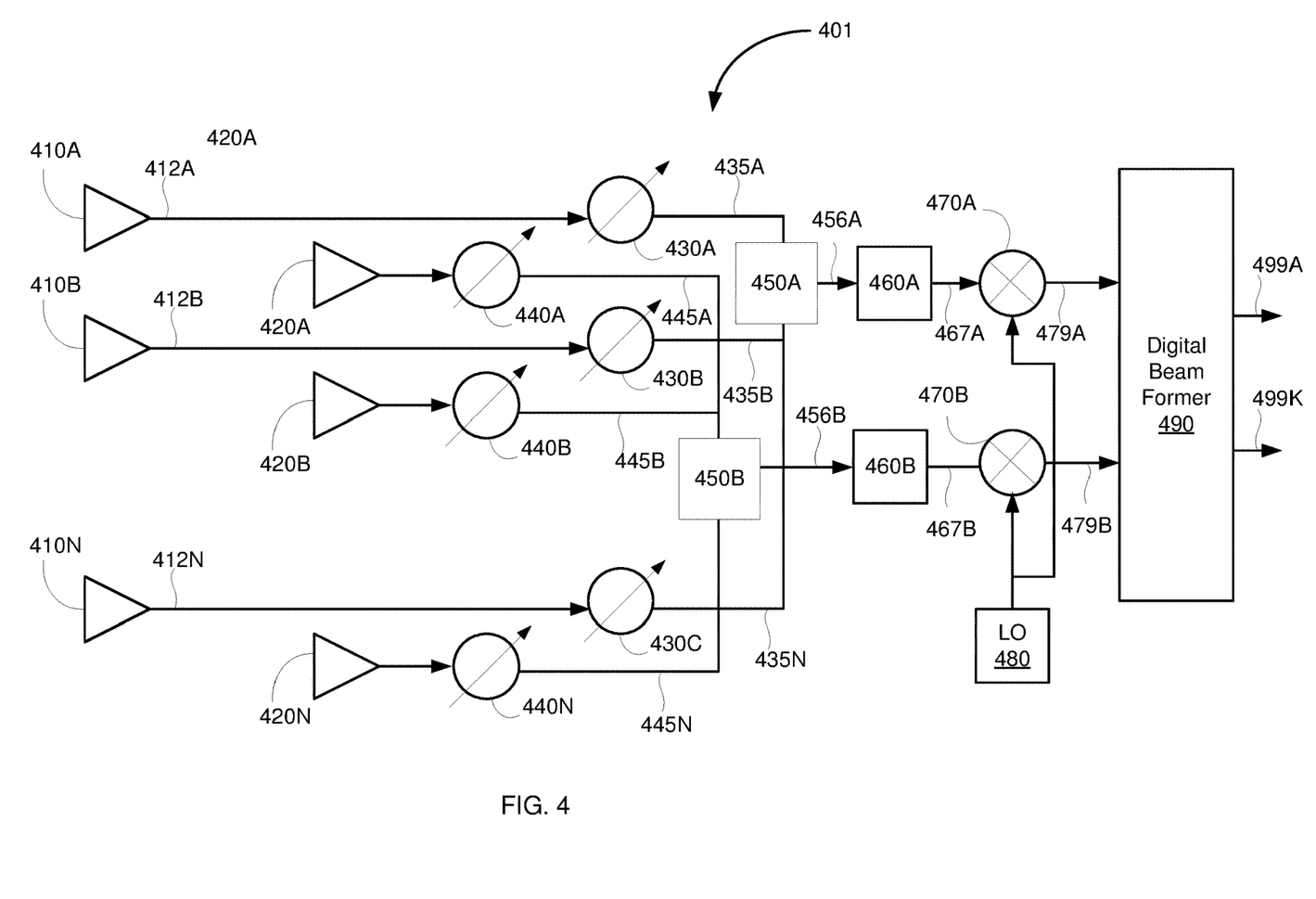
FIG. 4 is an example receiver section with a differently polarised antenna illustrating the beam forming in an embodiment.

FIG. 4 is an example receiver section with a differently polarised antenna illustrating the beam forming in an embodiment. The receiver section 401 is shown comprising antenna array 410A-N and 420A-N, first set of phase shifters 430A-N, second set of phase shifters 440A-N, analog combiner 450A&B, delay elements 460A and B, mixers 470A-K, LOs 480A-K, and digital beam former 490. Each element is described in further detail below.

The first set of phase shifters 430A-N, second set of phase shifters 440A-N, analog combiner 450A&B, delay elements 460A and B, mixers 470A-K, LOs 480A-K, and digital beam former 490 respectively operate similar to the elements the first set of phase shifters 330A-N, second set of phase shifters 340A-N, analog combiner 350A&B, delay elements 360A and B, mixers 370A-K, LOs 380A-K, and digital beam former 390 described with reference to the FIG. 3.

In one embodiment, the antenna array 410A-N are differently polarised compared to the antenna array 420A-N. For example, antenna array 410A-N may be vertically polarised while antenna array 420A-N is horizontally polarised. The RF signals from antenna 410A-N are provided to the first set of phase shifters 430A-N and the RF signals from the antenna 420A-N are provided to the second set of phase shifter 440A-440N.

In one Embodiment, the antenna array 410A-N and antenna array 420A-N are interposed to make a single antenna array pattern. Alternatively, the two antenna array may be deployed making separate pattern. Further, in an M number of antenna array system, the half the number of the antenna elements (M/2) may be vertically polarised to form the antenna array 410A-N and another half may be horizontally polarised to form 420A-N.

Due to the use of differently polarised antenna arrays, loss due to the different reflecting material in the vicinity of the antenna array may be reduced substantially and the system 401 may effectively be operated irrespective of geographical limitations. It may be appreciated, due to differently polarised antenna arrays 410A-N and 420A-N, the signal strength received on the array 410A-N is maximum while the signal strength on the array 420A-N is minimum, and vice-a versa.

Figure 5:
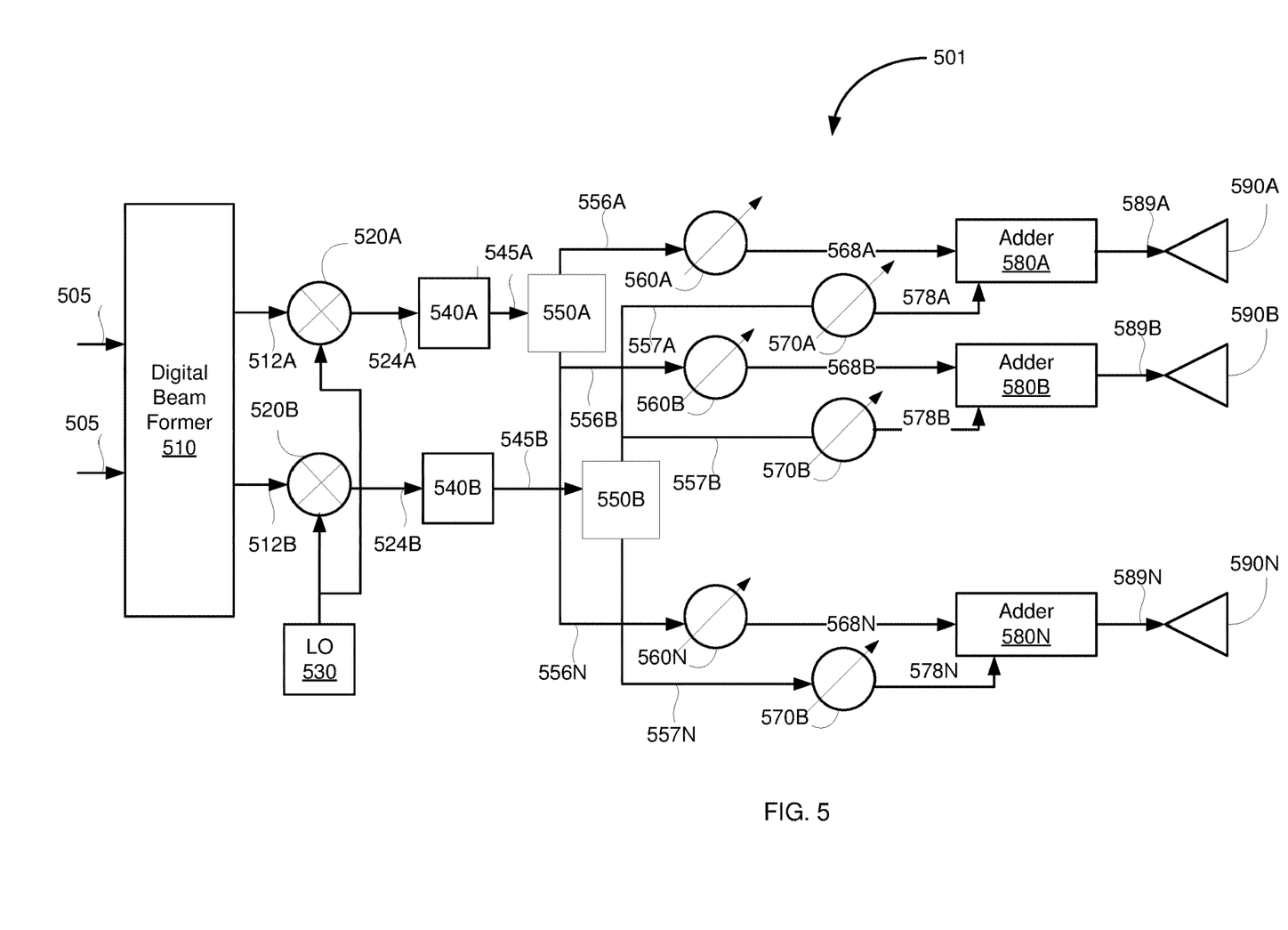
FIG. 5 is a block diagram illustrating the transmitted section in an embodiment.

FIG. 5 is a block diagram illustrating the transmitted section in an embodiment. The transmitter section 501 is shown comprising digital beam former 510, local oscillators 530, mixers 520A & B, delay elements 540A & B, analog splitters 550A & B, first set of phase shifter 560A-N, second set of phase shifters 570A-N, adders 580A-N, and antenna array 590A-N. Each element is described in further detail below.

The transmitter section 501 is configured to operate in juxtaposition with the receiver 301. For example, in the transmitter 501 the flow of signal is in reverse direction compared to the receiver section 301. The operations of each element and the signal flow may be apparent to a person skilled in the art by reading the disclosure herein. However, the operation is briefly described for conciseness. The digital beam former 510 performs the first level of beam forming from the received signal 505. The signal 505 may be received from processor or I/O devices. The digital beam former 510 may comprise digital to analog convertor (DAC) (not shown) to provide a baseband signals with the multiple beams. In one embodiment, the digital beam former provides two base band beams on path 512A and 512B.

The mixers 520A&B and the local oscillator 530, together operate to transform the base band signals on path 512A&B to RF signals by mixing operation. The converted RF signals are provided on path 524A&B. The delay elements 540A&B add delay to the RF signal on path 524A&B, the delayed RF signal is provided on path 545A&B. Each splitter 550A and 550B splits the signal on respective paths 545A and 545B into N signals. The splitter 550A provides the split N number of signals on the paths 556A-N and the splitter 550B provides the split N number of signals on the paths 557A-N.

The first set of phase shifters 560 provides a first set of phase shifts to the signals on the paths 556A-N. The phase shifted RF signal is provided on paths 568A-N. The second set of phase shifters 570 provides a second set of phase shifts to the signals on the paths 557A-N. The phase shifted RF signals are provided on path 578A-N.

The adders 580A-N adds the corresponding phase shifted signals on paths 568A-N with 578A-N. The added signals are provided on path 589A-N. The antennas 590A-N transmits the signal on paths 589A-N to the free space. In that, the digital beam former 510 performs first level of beam forming and the analog splitter, first set of mixers, second set of mixers, and adders, operate to provide second level of beam forming in the digital domain. The transmitter section 501 may be implemented in similar manner as receiver section 301. In that, the analog weights and digital weights may be determined using any relation 4, 5, 6.

While various embodiments of the present disclosure have been described above, it should be understood that they have been presented by way of example only, and not limitation. Thus, the breadth and scope of the present disclosure should not be limited by any of the above-discussed embodiments but should be defined only in accordance with the following claims and their equivalents.

What is claimed is:

1. A radio frequency receiver for beamforming comprising:
   a plurality of receiving antennas providing corresponding a plurality of radio frequency (RF) analog signals;
   a first set of phase shifters and a first set of adders configured to providing a first set of analog beams from a first set of RF analog signals from a first set of antennas in the plurality of receiving antennas;
   a second set of phase shifters and a second set of adders configured to providing a second set of analog beams from a second set of RF analog signals, in that, the first set of phase shifter and the second set of phase shifters adding a plurality of analog weights representing phase shift, and amplitude provided to the first set and the second set of RF analog signals and the second set of RF analog signals are selected from one of a copy of the first set of RF analog signals and from a second set of antennas that are different from the first set of antennas in the plurality of antennas;
   a digital beamformer configured to add a plurality of digital weights representing at least one of a delay and a phase shift to the first and the second set of analog beams, in its digital form, to provide a final set of digital beams; and
   a first set of delay elements adding a first delay in time to each of the first set of analog beams and a second set of delay elements adding a second delay in time to each of the second set of analog beams before providing to the digital beamformer,
   wherein at least one of a resolution, a direction and a strength of the final set of digital beams represented as $z_1$ through $z_L$, are set by relation:

$$\begin{bmatrix} z_1 \\ z_2 \\ \vdots \\ z_L \end{bmatrix} = \begin{bmatrix} y_1(t_1 - \Delta_1) \\ y_2(t_2 - \Delta_2) \\ \vdots \\ y_L(t_L - \Delta_L) \end{bmatrix} = \underbrace{\begin{bmatrix} A_{11} & \cdots & A_{1n} \\ \vdots & \vdots & \vdots \\ A_{L1} & \cdots & A_{Ln} \end{bmatrix}}_{H} \begin{bmatrix} x_1 \\ x_2 \\ \vdots \\ x_n \end{bmatrix}$$

In that, $A_{11}$ through $A_{Ln}$ are decomposed as $$\underline{[U\Sigma][V^H]}$$

wherein $U\Sigma$ representing the plurality of digital weights and the $V^H$ representing the plurality of analog weights.

2. The radio frequency receiver of claim 1, further comprising a set of splitters generating the copy of the first set of RF analog signals.

3. The radio frequency receiver of claim 2, further comprising a set of mixer operative to shift the first set of analog beams and the second set of analog beams to a baseband frequency before providing to the digital beam former.

4. The radio frequency receiver of claim 3, wherein the $\Delta_1$ to $\Delta_L$ representing the first delay in time and the L-th delay in time, $x_i$ for i=1 to n representing the first set of RF analog signals when the second set of RF analog signals is the copy of the first set of RF analog signals.

5. The radio frequency receiver of claim 4, where in the $A_{11}$ through $A_{Ln}$, are decomposed as $[U][\Sigma V^H]$ wherein U representing the plurality of digital weights in the digital beamformer and $\Sigma V^H$ is a scaled unitary matrix representing the plurality of analog weights.

6. The radio frequency receiver of claim 4, where in the $A_{11}$ through $A_{Ln}$, area decomposed into QR decomposition with the Q representing the plurality of digital weights and R representing the plurality of analog weights.

7. The radio frequency receiver of claim 4, where in the $A_{11}$ through $A_{Ln}$ area decomposed into polar decomposition with the P representing the plurality of digital weights and S representing the plurality of analog weights.

8. A radio frequency transmitter for beamforming comprising:
   a digital beamformer configured to add a plurality of digital weights representing at least one of a delay and a phase shift to a set of transmit signals in its digital form, providing a plurality of digital beams;
   a first set of splitter splitting a first set of digital beams in the plurality of digital beams into first set of analog beams;
   a second set splitter splitting a second set of digital beams in the plurality of digital beams into second set of analog beams;
   a first set of phase shifters providing a first set of weighted analog beams;
   a second set of phase shifters providing second set of weighted analog beams, wherein the first set of phase shifter and the second set of phase shifters adding a plurality of analog weights representing phase shifts and amplitude provided to the first set and the second set of analog beams; and
   a set of adder adding the first set of weighted analog beams and second set of weighted analog beams to form a set of radio frequency (RF) signals;
   a set of transmitting antennas transmitting the set of (RF) signals to form a final transmit beam,
   wherein at least one of a resolution, a direction and a strength of the final set of digital beams represented as $z_1$ through $z_L$, are set by relation:

$$\begin{bmatrix} z_1 \\ z_2 \\ \vdots \\ z_L \end{bmatrix} = \begin{bmatrix} y_1(t_1 - \Delta_1) \\ y_2(t_2 - \Delta_2) \\ \vdots \\ y_L(t_L - \Delta_L) \end{bmatrix} = \underbrace{\begin{bmatrix} A_{11} & \cdots & A_{1n} \\ \vdots & \vdots & \vdots \\ A_{L1} & \cdots & A_{Ln} \end{bmatrix}}_{H} \begin{bmatrix} x_1 \\ x_2 \\ \vdots \\ x_n \end{bmatrix}$$

In that, $A_{11}$ through $A_{Ln}$ are decomposed as $$\underline{[U\Sigma][V^H]}$$

wherein $U\Sigma$ representing the plurality of digital weights and the $V^H$ representing the plurality of analog weights.

9. The radio frequency transmitter of claim 8, further comprising a first delay element adding a first delay in time to each of the first set of analog beams and a k-th delay elements adding a k-th delay in time to each of the second set of analog beams before providing to the first set of splitter and the second set of splitter.

\* \* \* \* \*